United States Patent
Kruglick

(10) Patent No.: US 9,075,648 B2
(45) Date of Patent: Jul. 7, 2015

(54) VIRTUAL MACHINE SWITCHING BASED ON MEASURED NETWORK DELAY

(75) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 235 days.

(21) Appl. No.: 13/582,912

(22) PCT Filed: Apr. 27, 2012

(86) PCT No.: PCT/US2012/035504
§ 371 (c)(1),
(2), (4) Date: Sep. 5, 2012

(87) PCT Pub. No.: WO2013/162599
PCT Pub. Date: Oct. 31, 2013

(65) Prior Publication Data
US 2013/0290956 A1 Oct. 31, 2013

(51) Int. Cl.
*G06F 9/455* (2006.01)
*G06F 9/46* (2006.01)
*H04L 12/841* (2013.01)

(52) U.S. Cl.
CPC ........... *G06F 9/45558* (2013.01); *H04L 47/283* (2013.01); *G06F 2009/45575* (2013.01)

(58) Field of Classification Search
CPC .................. G06F 9/45558; G06F 2009/45575; H04L 47/283
USPC ............................................................ 718/1
See application file for complete search history.

(56) References Cited

U.S. PATENT DOCUMENTS

| | | | |
|---|---|---|---|
| 6,526,371 B1 * | 2/2003 | Klein et al. | 702/186 |
| 2003/0041090 A1 * | 2/2003 | Armstrong et al. | 709/106 |
| 2006/0095905 A1 * | 5/2006 | Courchesne et al. | 718/100 |
| 2008/0155537 A1 | 6/2008 | Dinda et al. | |
| 2008/0163211 A1 * | 7/2008 | Mizuno | 718/1 |
| 2009/0300605 A1 | 12/2009 | Edwards et al. | |
| 2010/0146503 A1 | 6/2010 | Tsai et al. | |

(Continued)

FOREIGN PATENT DOCUMENTS

WO   PCT/US12/35504   10/2013

OTHER PUBLICATIONS

Diego Ongaro et al; "Scheduling I/O in Virtual Machine Monitors"; Journal Rice University; 2008; 10 pages; US.

(Continued)

*Primary Examiner* — Emerson Puente
*Assistant Examiner* — Willy W Huaracha
(74) *Attorney, Agent, or Firm* — Jensen & Puntigam, PS

(57) ABSTRACT

Technologies related to virtual machine switching based on measured network delay are generally described. A network delay aware Virtual Machine (VM) may be configured to adapt a Virtual Machine Monitor (VMM) to delay switching back to the network delay aware VM by a delay amount determined using a measured network delay. The measured network delay may comprise a delay between sending a network communication and receiving a network response. By delaying switching back to the network delay aware VM, additional processing resources are freed for other VMs managed by the VMM, thereby increasing efficiency of computing devices including network delay aware VMs, and correspondingly increasing efficiency of data centers including such computing devices.

27 Claims, 7 Drawing Sheets

(56) References Cited

U.S. PATENT DOCUMENTS

| | | |
|---|---|---|
| 2010/0153763 A1 | 6/2010 | Sood |
| 2010/0192149 A1 | 7/2010 | Lathrop et al. |
| 2011/0022812 A1 | 1/2011 | Van Der Linden et al. |
| 2011/0283017 A1 | 11/2011 | Alkhatib et al. |
| 2011/0314467 A1 | 12/2011 | Pearson |
| 2013/0100816 A1* | 4/2013 | Bergamasco et al. ......... 370/237 |

OTHER PUBLICATIONS

Joshua Reich et al; "VMTorrent: Virtual Appliances On-Demand"; ACM SIGCOMM Computer Communication Review, vol. 40; 2010; pp. 453-454; US.

S.T. Jones et al; "Antfarm: Tracking Processes in a Virtual Machine Environment"; Proceedings of the USENIX Annual Technical Conference; 2006; pp. 1-14; US.

Aman Kansal et al; "Virtual Machine Power Metering and Provisioning"; in proceeding of the 1st ACM symposium on Cloud Computing (ACM, 2010); pp. 39-50; US.

Matt Bishop; "Computer Security: Art and Science"; book; 2002; Addison-Wesley; Section 17.3.3; p. 467-470.

International Searching Authority, International Search Report and Written Opinion of the International Searching Authority for PCT/US12/35504, Jul. 16, 2012.

* cited by examiner

US 9,075,648 B2

VIRTUAL MACHINE SWITCHING BASED ON MEASURED NETWORK DELAY

CROSS-REFERENCE TO RELATED APPLICATIONS

The present application is a U.S. national stage filing under 35 U.S.C. 371 of International Application No. PCT/US12/35504, entitled "VIRTUAL MACHINE SWITCHING BASED ON MEASURED NETWORK DELAY", filed on Apr. 27, 2012, the entire contents of which are incorporated herein by reference.

BACKGROUND

Unless otherwise indicated herein, the materials described in this section are not prior art to the claims in this application and are not admitted to be prior art by inclusion in this section.

In modern data centers, numerous Virtual Machines (VMs), often associated with numerous data center customers, execute on numerous servers. It is also common for multiple VMs to execute on any one data center server. Virtual Machine Managers (VMMs) manage sharing of hardware resources, such as processor time, by VMs running on each data center server. One example approach employed by VMMs is the so-called "fair sharing" approach, in which each VM under the management of a common VMM is generally assigned a substantially equal amount of processor time.

VMs within a data center may be configured for any of a huge variety of tasks. Some VMs may support ecommerce, such as by providing product descriptions, prices, customer account information and payment processing services supporting an ecommerce website. Some VMs may support mobile applications such as news, sports, weather, and email feeds. Some VMs may support single- or multiplayer gaming applications. The variety of uses for VMs within data centers is very wide and continues to grow. Different VMs have a variety of different needs and behaviors. Adapting data center technologies to run as efficiently as possible in view of the different needs and behaviors of VMs presents an ongoing challenge in the industry.

SUMMARY

The present disclosure generally describes technologies including devices, methods, and computer readable media relating to virtual machine switching based on measured network delay. Some example devices may include data center servers comprising a processor, a VMM, and at least one network delay aware VM. The VMM may be configured to manage execution of multiple VMs, including the network delay aware VM, by the processor, for example by switching the processor between execution of the VMs. The network delay aware VM may be configured to adapt the VMM to delay switching the processor back to execution of the network delay aware VM.

Some example network delay aware VMs may include a timing signaler module configured to adapt the VMM to delay switching the processor back to execution of the network delay aware VM by approximately a delay amount determined using a measured network delay. This delay amount may be referred to herein as "measurement based switch back delay". Measurement based switch back delay may be determined using a variety of approaches described herein. Network delay measurements used in determining measurement based switch back delay may be made by a delay measurement module. The delay measurement module may be located in the network delay aware VM, or in a Session Border Controller (SBC) or other location from which the delay measurement module may monitor network communications.

In some embodiments, the timing signaler module may be configured to provide a notification to the network delay aware VMM, and the network delay aware VMM may be configured to retrieve, in response to the notification, the network delay input comprising the measurement based switch back delay. For example, the network delay aware VMM may be configured to retrieve the network delay input from a Session Border Controller (SBC), as described herein. The network delay aware VMM may furthermore be configured to adapt the scheduler to delay switching the processor back to execution of the network delay aware VM by approximately the measurement based switch back delay.

In some embodiments, the timing signaler module may be configured to adapt a VMM, such as a non-network delay aware or "ordinary" VMM, to delay switching to the network delay aware VM by approximately the measurement based switch back delay by requesting switch-delaying data so that the VMM delays switching to the network delay aware VM to allow time to access the switch-delaying data. The timing signaler module or network delay aware VM may be configured to identify switch-delaying data for example by identifying data with a storage age older than a predetermined storage age, or by identifying data with a storage location having a known approximate access delay.

Some example network delay aware VMMs may provide an Application Program Interface (API) configured to receive the network delay input comprising the measurement based switch back delay. In response to receiving the network delay input, network delay aware VMMs may be configured to adapt the scheduler to delay switching the processor back to execution of the network delay aware VM by approximately the measurement based switch back delay.

In some embodiments, the network delay aware VMM may be configured to receive the network delay input from the network delay aware VM. In some embodiments, the network delay aware VMM may be configured to receive the network delay aware VM notification, and to retrieve, e.g., from the SBC in response to the network delay aware VM notification, the network delay input.

In some embodiments, the data center and/or network delay aware VMM may be configured to co-locate VMs, which VMs are associated with a same data center customer as the network delay aware VM, on a server comprising the network delay aware VMM and/or network delay aware VM so that the co-located VMs benefit from processor time freed by delay in switching back to execution of the network delay aware VM.

Some example data centers may comprise at least one server comprising the processor, network delay aware VMM, network delay aware VM, and/or network delay aware SBC introduced above. The network delay aware VMM, network delay aware VM, and/or network delay aware SBC may operate according to the teachings provided herein. In some embodiments, the network delay aware SBC may comprise a delay measurement module configured to measure network delay between sending network communications by the network delay aware VM and receiving network responses by the network delay aware VM. The network delay aware VM and/or VMM may be configured to retrieve delay measurements and/or network delay input comprising measurement based switch back delay from the SBC, as described herein.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include a server comprising a processor, a memory, and one or more network delay aware VMM modules, network delay aware VM modules, and/or network delay aware SBC modules, as described in further detail herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
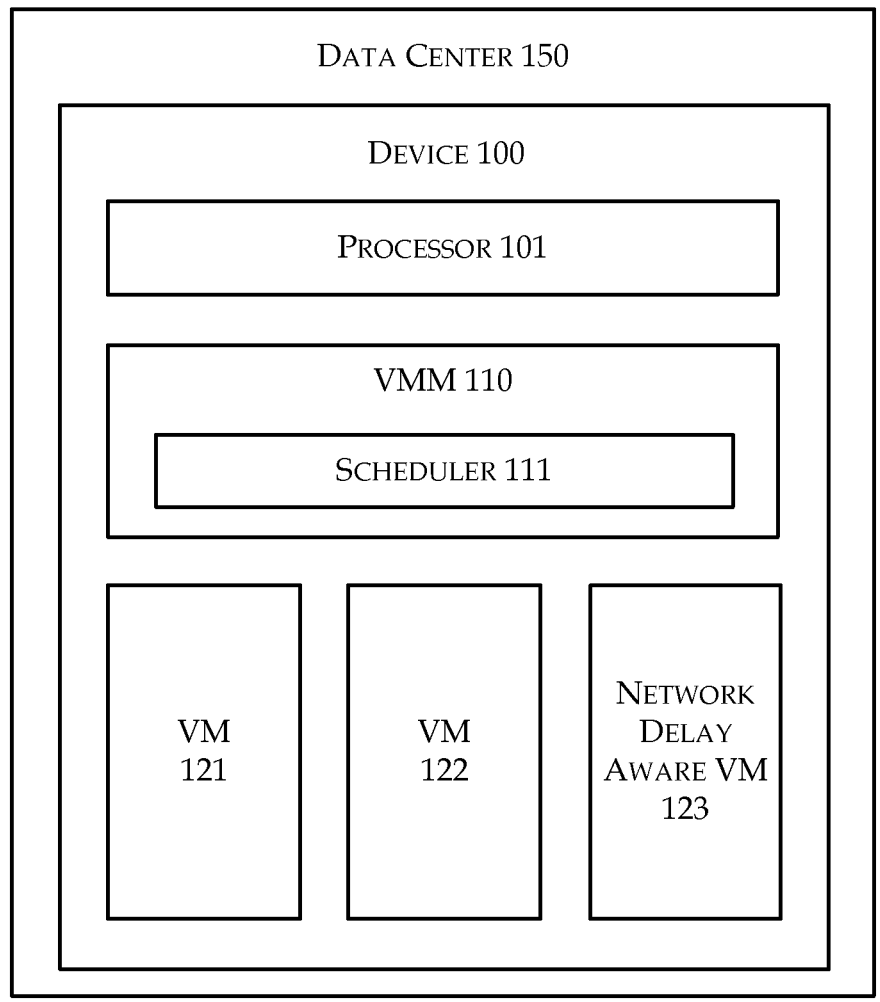
FIG. 1 is a block diagram illustrating an example device in a data center, the device including a network delay aware VM.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to virtual machine switching based on measured network delay. A network delay aware VM may be configured to adapt a VMM to delay switching back to the network delay aware VM by a delay amount determined using a measured network delay. The measured network delay may comprise a delay between sending a network communication and receiving a network response. By delaying switching back to the network delay aware VM, additional processing resources are freed for other VMs managed by the VMM, thereby increasing efficiency of computing devices including network delay aware VMs, and correspondingly increasing efficiency of data centers including such computing devices.

FIG. 1 is a block diagram illustrating an example device in a data center 150, the device including a network delay aware VM 123, arranged in accordance with at least some embodiments of the present disclosure. Data center 150 includes a device 100, and device 100 includes a processor 101, a VMM 110, a VM 121, a VM 122, and network delay aware VM 123. VMM 110 includes a scheduler 111. FIG. 1 provides a generic view of an example device 100, which is illustrated in more detail in FIG. 2. Various embodiments of device 100 are described in connection with FIG. 3, FIG. 4, and FIG. 5. Methods that may be performed in connection with device 100 are described in connection with FIG. 6 and FIG. 7. Three VMs are shown in FIG. 1 for simplicity and one skilled in the art will appreciate that there may be a different number of VMs.

In some embodiments, device 100 may comprise a server in data center 150. VMM 110 may be configured to manage execution of VMs 121, 122, 123 by processor 101, where managing execution of VMs 121, 122, 123 comprises switching processor 101 between execution of different VMs 121, 122, 123. Scheduler 111 may for example be configured to schedule control of processor 101 by VMs 121, 122, 123. Network delay aware VM 123 may be configured to adapt VMM 110 to delay switching processor 101 back to execution of network delay aware VM 123 by approximately a delay amount determined using a measured network delay, referred to herein as a measurement based switch back delay.

VMs, such as VMs 121, 122, 123 within data center 150 may share device 100 resources by context and/or world switching between VMs, under management of VMM 110 and scheduler 111. This allows the VMs to alternately use physical computing resources of device 100. In some embodiments, switching between VMs 121, 122, 123 may take anywhere from around 200 microseconds (µS), for world switching without hardware assistance, to around 40 nanoseconds (nS), for context switching without buffer swaps. VMM 110 may be configured to switch between VMs 121, 122, 123 hundreds to thousands of times per second.

Scheduler 111 may be configured to employ numerous techniques and technologies to determine which VM 121, 122, 123 to switch to, and for how long a particular VM should retain control of processor 101. Any scheduling technology currently known or developed in the future may be used in combination with embodiments of this disclosure. For example, in some embodiments, scheduler 111 may be configured to use a fair-sharing technique to switch processor 101 between execution of different VMs. In fair-sharing type scheduling techniques, different VMs are generally provided with substantially equal processor 101 time, although numerous exceptions and special circumstances may also be applied which may ultimately provide certain VMs with more processor 101 time than others. In some embodiments, under fair-sharing techniques or otherwise, scheduler 111 may be configured to use local parameters such as hard drive access delays and/or expected VM total duration to schedule VM switching. Also, in some embodiments processor 101 may be implemented as a multiprocessor chip, and scheduler 111 may be configured to schedule activities of any processors on the multiprocessor chip.

Under fair-sharing and/or other strategies for sharing device 100 hardware by VMs 121, 122, 123, VMs with no useful tasks to perform may continue to take up a substantial fraction of device 100 computing power as they continuously receive and then relinquish possession of processor 101, as a precaution to make sure that all VMs 121, 122, 123 have the opportunity to act immediately when tasks for them arise.

Under some circumstances, whether scheduler 111 uses a fair-sharing approach or otherwise, VMs 121, 122, 123 may not need processor 101 resources that would typically be allocated by scheduler 111. For example, when VM 121 sends a network communication and awaits a network response prior to performing a next task, VM 121 may predictably not need processor 101 resources during a period between sending the network communication and receiving the network response. This period is generally referred to herein as network delay.

Network delay may comprise a network communications delay, also referred to herein as a "ping time", and/or an action delay. Communications delay includes delays associated with transmission of network communications between device 100 and a client node (not shown in FIG. 1) that communicates with device 100 via networks including, for example, data center networks and the public internet. Action delay includes delays associated with actions of a user and/or client node, which actions trigger a network response. Action delay may also include delays associated with actions of other services, APIs, or components of a service oriented application.

Ping times of about 100 milliseconds (ms) are common on modern networks, although ping times may vary substantially. Ping times of 100 ms may be long enough for many, e.g., tens to hundreds, of unnecessary VM switches back to VM 121, which unnecessary VM switches would use processor resources but would not result in completion of useful tasks by VM 121.

Action delay times may vary according whether human action or machine action is involved and the type of action involved. For example, human action in a chess game may typically be slower than human action in the context of interactions with an automated voice response system. Action delays of from several seconds to several minutes may be long enough for many additional, e.g., thousands to tens of thousands, of unnecessary VM switches back to VM 121, which unnecessary VM switches would also use processor resources but would not result in completion of useful tasks by VM 121.

Example VMs that may predictably not need processor 101 resources during network delay may comprise gaming VMs configured with one or more game modules, such as a gaming platform, gaming application, and/or player-specific gaming VM. Some gaming VMs may have no work to be done between sending a network communication comprising information to be presented to a player, and subsequently receiving a network response comprising information relating to the player's actions in a game.

Some gaming VMs may include certain game tasks that operate according to a turn-taking approach and such tasks may have work periods of uncertain length, based on computational load, but network delays of relatively predictable minimum length due to minimum network communications delay and/or minimum action delay. Gaming VMs may be configured to measure such network delay, and to calculate measurement based switch back delay according to the techniques provided herein, and to communicate with VMM 110 after sending outgoing network communications to adapt VMM 110 to delay switching processor 101 back to execution of an applicable gaming VM by approximately the measurement based switch back delay.

In a FARMVILLE® or CASTLEVILLE® style game, for example, animated sprites may run on the client node, so there may be nothing for a gaming VM to do between sending a network communication comprising a display array and receiving a network response comprising a next player command. Moreover, not all player actions at the client node may result in network responses being sent to the gaming VM. The player may perform some actions, e.g., pressing keys at the client node to control movements of a character within the display array, which may not involve interactions with the gaming VM due to architectural separation under service oriented architectures. Certain other actions, such as actions modifying attributes of the display array, may result in network responses being sent to the gaming VM. It will be appreciated that different games, and different players, may yield different typical response frequencies, and therefore different typical network delays from the perspective of the gaming VM. Depending on game architecture, a huge variety of different typical network delays are possible. The same is true of other, non-game related VMs—a variety of different network delays may result from different VM architecture, function, and typical user interactions.

In some embodiments, network delay aware VM 123 may be configured to measure network delay, or otherwise cause network delay to be measured on its behalf. Network delay aware VM 123 may be configured to calculate measurement based switch back delay using network delay measurements, and to adapt VMM 110 to delay switching processor 101 back to execution of network delay aware VM 123 by approximately the measurement based switch back delay. Network delay measurements characterize environments external to datacenter 150, e.g., communications delay associated with networks outside datacenter 150 and/or action delays associated with waiting for user response, to adapt VMM 110 to schedule VM switching. In some embodiments, network delay aware VM 123 may be configured to signal to VMM 110 when network delay aware VM 123 is ready to relinquish resources for a relatively long period of time, e.g., longer than a typical period for cycling through processing VMs 121, 122, 123 running on device 100. Network delay aware VM 123 may be configured according to any of several embodiments disclosed herein. VMM 110 may comprise a "basic" or non-network delay aware VMM in some embodiments, or VMM 110 may comprise a network delay aware VMM configured according to several different embodiments disclosed herein.

Using the technologies according to some embodiments provided herein, network delay aware VM 123 may for example measure network delay associated with network communications, calculate measurement based switch back delay using network delay measurements, generate a network delay input comprising the measurement based switch back delay, and adapt VMM 110 according to the network delay input, thereby freeing device 100 resources for other VMs 121, 122.

Device 100 resources freed as a result of network delay aware VM 123 relinquishing resources may benefit colocated VMs 121, 122, which may receive additional processor 101 time and resources. The additional processor 101 time is "free" and gained due to the elimination of time that would otherwise be wasted instance switching back to network delay aware VM 123 while it awaits network responses. Since the benefits of network delay aware VM 123 operations accrue to colocated VMs 121, 122, embodiments may deploy network delay aware VM 123 within virtual private datacenters or scenarios where owner(s) of network delay aware VM 123 can purposely deploy multiple of their own VMs on same hardware, e.g., device 100, as network delay aware VM 123.

In some embodiments, network delay aware VM 123 may be associated with a data center customer, and data center 150 may be configured to co-locate VMs 121, 122 other than network delay aware VM 123, which VMs 121, 122 are (in this example) associated with the same data center customer, on device 100 so that the co-located VMs 121, 122 benefit from processor 101 time freed by delay in switching back to execution of network delay aware VM 123.

VMM 110 may continue to manage execution of VMs 121, 122 other than network delay aware VM 123 using a fair-sharing technique or any other techniques for switching processor 101 between execution of different VMs 121, 122. However, VMM 110 may be configured to manage execution of network delay aware VM 123 differently than other VMs 121, 122, as a result of adapting VMM 110 by network delay aware VM 123.

Certain side channel attacks involve computing tasks relinquish their processor uses by ending their process at particular times in order to pass information to another process, to allow the other process to gain information by knowing when resources were passed to it. Solutions to this type of side channel attack may use fixed time slice sharing. In order to prevent information from being gleaned by timing relinquishment of resource usage in the solution presented here, embodiments of VMM 110 may continue frequent switches between other VMs 121, 122 and/or to use freed resources for purposes such as queued system tasks and/or load balancing migrations, while continuing a same switching pattern for VMs 121, 122 other than network delay aware VM 123.

Figure 2:
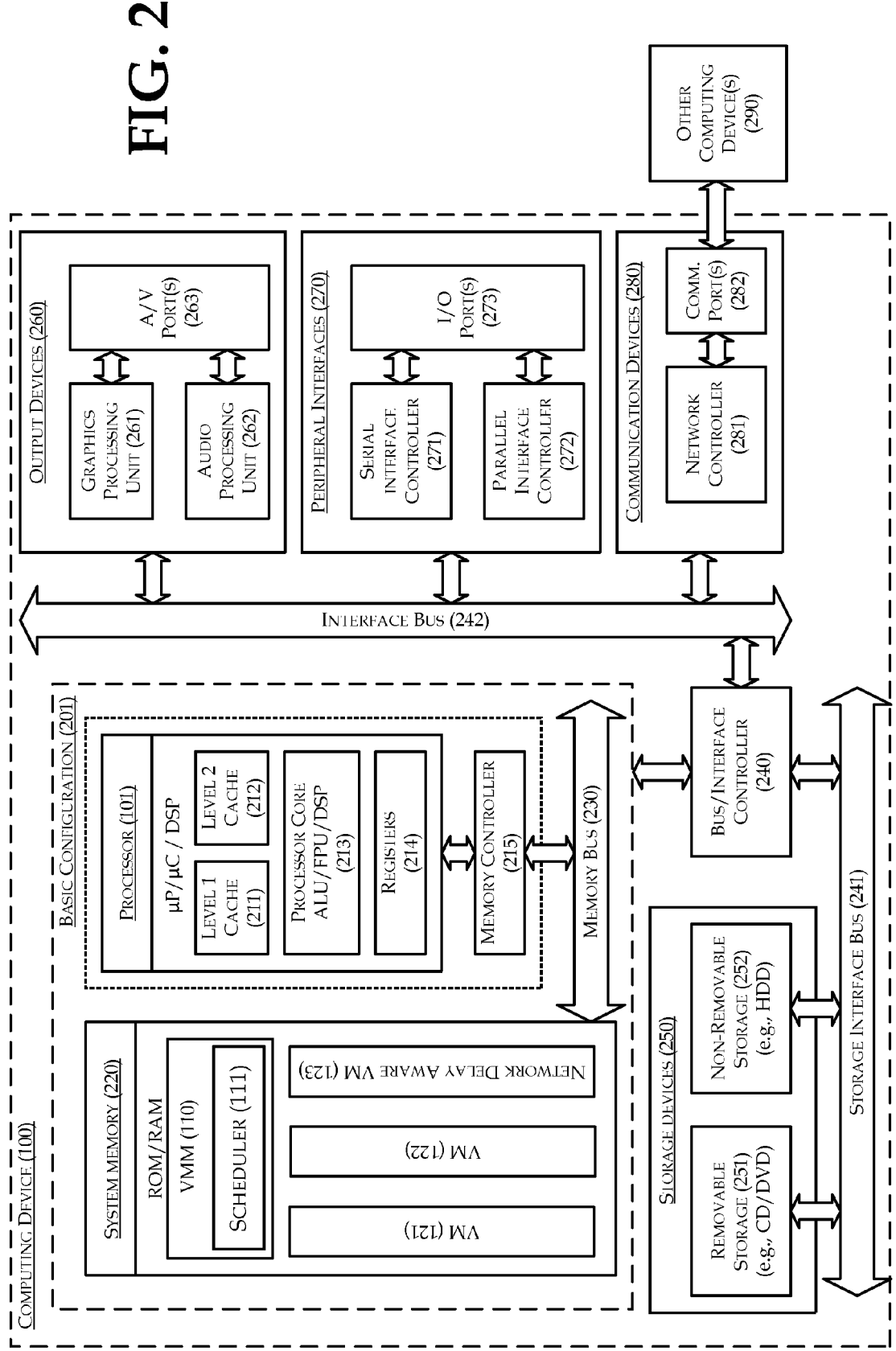
FIG. 2 is a block diagram illustrating one example of a device according to FIG. 1.

FIG. 2 is a block diagram illustrating one example of device 100 according to FIG. 1, arranged in accordance with at least some embodiments of the present disclosure. In a very basic configuration 201, computing device 100 may include one or more processors 101 and a system memory 220. A memory bus 230 may be used for communicating between processor 101 and system memory 220.

Depending on the desired configuration, processor 101 may be of any type including but not limited to a microprocessor (μP), a microcontroller (μC), a digital signal processor (DSP), or any combination thereof. Processor 101 may include one or more levels of caching, such as a level one cache 211 and a level two cache 212, a processor core 213, and registers 214. Processor core 213 may include an arithmetic logic unit (ALU), a floating point unit (FPU), a digital signal processing core (DSP Core), or any combination thereof. Device 100 may include one processor core 213, as shown in FIG. 2, or multiple processor cores as will be appreciated. A memory controller 215 may also be used with processor 101, or in some implementations memory controller 215 may be an internal part of processor 101.

Depending on the desired configuration, system memory 220 may be of any type including but not limited to volatile memory (such as RAM), non-volatile memory (such as ROM, flash memory, etc.), or any combination thereof. System memory 220 may includes VMM 110 including scheduler 111, and one or more VMs 121, 122, 123. VMs 121, 122, 123 may include, for example, non-network delay aware VMs 121, 122, and network delay aware VM 123.

Computing device 100 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. Data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 220, removable storage 251, and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 100. Any such computer storage media may be part of device 100.

Computing device 100 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more A/V ports 263. Example peripheral interfaces 270 may include a serial interface controller 271 or a parallel interface controller 272, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 273. Other conventional I/O devices may be connected as well such as a mouse, keyboard, and so forth. An example communications device 280 includes a network controller 281, which may be arranged to facilitate communications with one or more other computing devices 290, such as client nodes, over network communications via one or more communication ports 282.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 100 may be implemented as server in data center 150, as shown in FIG. 1, or otherwise, optionally any device comprising VMM 110 configured to manage multiple VMs 121, 122, 123.

Figure 3:
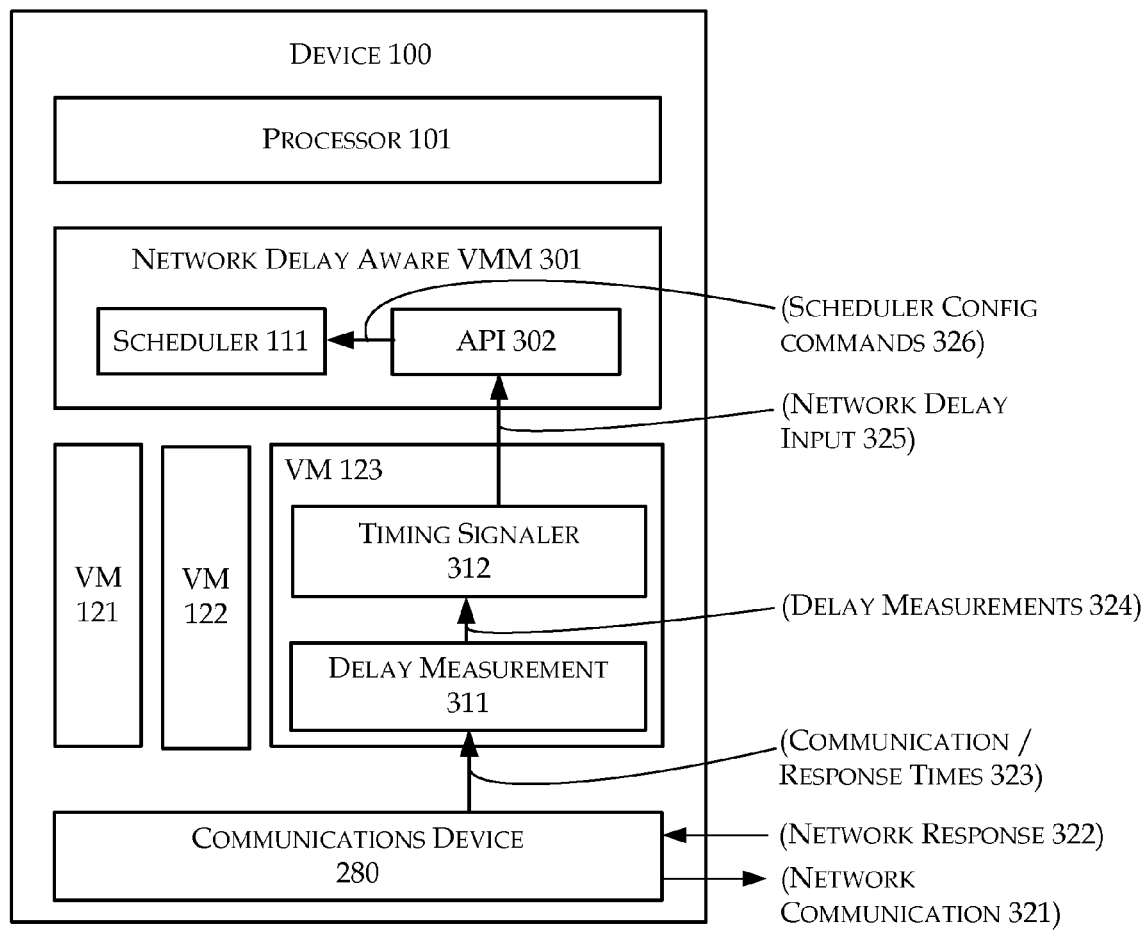
FIG. 3 is a block diagram illustrating an example device including a network delay aware VM configured to produce a network delay input comprising a measurement based switch back delay, and a network delay aware VMM configured to receive the network delay input.

FIG. 3 is a block diagram illustrating an example device including a network delay aware VM configured to produce a network delay input comprising a measurement based switch back delay, and a network delay aware VMM configured to receive the network delay input, arranged in accordance with at least some embodiments of the present disclosure. In FIG. 3, like elements to elements illustrated in other drawings herein are given like identifiers. Device 100 comprises processor 101, a network delay aware VMM 301, VMs 121, 122, and 123, wherein VM 123 is a network delay aware VM, and communications device 280. Network delay aware VMM 301 comprises scheduler 111 and an API 302. Network delay aware VM 123 comprises a timing signaler module 312 and a delay measurement module 311.

In embodiments according to FIG. 3, timing signaler module 312 may be configured to calculate measurement based switch back delay using delay measurements 324 from delay measurement module 311, and to provide network delay input 325 comprising the measurement based switch back delay to network delay aware VMM 301. Network delay aware VMM 301 may be configured to adapt, in response to received network delay input 325, scheduler 111 to delay switching processor 101 back to execution of network delay aware VM 123 by approximately a delay amount determined using the measurement based switch back delay.

In FIG. 3, network delay aware VM 123 includes delay measurement module 311 configured to measure network delay between sending network communication 321 and receiving network response 322. Delay measurement module 311 may be configured to measure times or receive communication/response times 323 from communications device 280, to calculate delay measurements 324, and to provide delay measurements 324 to timing signaler module 312.

In some embodiments, for example, delay measurement module 311 may be configured to receive or retrieve, from communications device 280, communication/response times 323 comprising time stamps associated with outgoing network communication 321 and a next incoming network response such as network response 322. Delay measurement module 311 may be configured to calculate delay measurements 324 as a difference between an outgoing network communication time stamp and an incoming network response time stamp.

In some embodiments, delay measurement module 311 may be configured to receive notifications, from communications device 280, each time a network communication 321 is sent, and each time a network response 323 is received. Delay measurement module 311 may be configured to start a clock in response to a notification that network communication 321 is sent, and to stop the clock in response to a notification that network response 322 is received. Delay measurement module 311 may be configured to calculate delay measurements 324 as a clocked difference between times of network communication 321 and network response 322. In some embodiments, delay measurement module 311 may be configured to retrieve communication data from communications device 280, e.g., communication history data comprising times of network communications 321 and network responses 322. Delay measurement module 311 may be configured to calculate delay measurements 324 using retrieved communication data.

In some embodiments, delay measurement module 311 may be configured to monitor certain identified network communications and responses, comprising a subset of all network communications and responses. Consider for example a network delay aware VM 123 which communicates with various cloud client computing devices. Initial measurements by delay measurement module 311 may indicate that responses from some of the cloud client devices may be relatively fast, while responses from other cloud client devices may be relatively slow. A predetermined threshold value may be established to classify responses considered to be relatively slow, e.g., responses longer than the predetermined threshold value may be classified as slow. Network delay aware VM 123 may configure delay measurement module 311 to measure network delay for cloud client devices associated with slow response times, e.g., by providing IP addresses or other identifiers for the slow computing devices to the delay measurement module 311. Delay measurement module 311 may then measure network delay for the subset of all network communications and responses for the identified devices. Network delay aware VM 123 may also be configured to adapt VMM 301 in connection with communications with the identified devices.

Some embodiments may omit delay measurement module 311, and instead rely on native and/or enhanced capabilities of VM 123 and/or VMM 301 to collect network delay information, as will be appreciated with the benefit of this disclosure. In embodiments without delay measurement module 311, timing signaler module 312 may be configured to receive or retrieve delay measurements 324 from locations other than from delay measurement module 311, e.g., from an API provided by VM 123 or VMM 301.

Timing signaler module 312 may be configured to receive or retrieve delay measurements 324 from delay measurement module 311, to calculate measurement based switch back delay using delay measurements 324, to generate network delay input 325, and to provide network delay input 325 to network delay aware VMM 301.

In some embodiments, timing signaler module 312 may be configured to calculate measurement based switch back delay as a delay amount substantially equal to measured network delay included in delay measurements 324. For example, measurement based switch back delay may be within 25% of one or more delay measurements included in delay measurements 324.

In some embodiments, timing signaler module 312 may be configured to calculate measurement based switch back delay as a delay amount determined using measured network delay included in delay measurements 324. As used herein, "a delay amount determined using a measured network delay" can be any delay amount calculated or otherwise identified using a measured network delay, and need not be substantially equal to any of delay measurements 324. For example, measurement based switch back delay may comprise a minimum network communications delay combined with a minimum action delay, determined e.g., by any formula applied to delay measurements 324, or by comparison and/or processing of delay measurements 324. Measurement based switch back delay may also be calculated for example by looking up measurement based switch back delays in a table correlating delay measurements 324 and corresponding measurement based switch back delays.

In some embodiments, timing signaler module 312 may be configured to calculate measurement based switch back delay as a predicted actual network delay, or a partial predicted actual network delay, including anything from 1%-99% of predicted actual network delay resulting from sending network communication 321. Predicted actual network delay may be determined, for example, as an average of one or more network delays previously experienced by network delay aware VM 123.

In some embodiments, timing signaler module 312 may be configured to generate network delay input 325 by incorporating calculated measurement based switch back delay, along with an instruction to delay switching processor 101 back to execution of network delay aware VM 123 by approximately the measurement based switch back delay, into any object or data structure that may be operable with API 302.

Timing signaler module 312 may be configured to provide network delay input 325, e.g., as a function call to API 302, in response to a delay event. A delay event may comprise, for example, sending network communication 321 by network delay aware VM 123. In some embodiments, a subset of network communications may comprise delay events, e.g., communications with identified computing devices as discussed above Timing signaler module 312 may be configured to monitor and/or receive notifications of delay events from network delay aware VM 123, and to provide network delay input 325 to API 302 in response to detected or received delay events.

In some embodiments, network delay aware VMM 301 may be configured to receive network delay input 325 from network delay aware VM 123. Network delay aware VMM 301 may be configured to provide API 302 or other communication means, configured to receive network delay input 325, in a same manner as any number of other APIs are provided in VMMs for use by VMs. In response to receiving network delay input 325 via API 302, network delay aware VMM 301 may be configured to adapt scheduler 111 to delay switching processor 101 back to execution of network delay aware VM 123 by approximately the measurement based switch back delay included in network delay input 325. API 302 may for example be configured to provide scheduler configuration commands 326 to scheduler 111. Scheduler configuration commands 326 may be configured to interact with particular scheduler 111 embodiments; to adapt scheduler 111 to implement measurement based switch back delay. In some embodiments, scheduler 111 may be configured to support delay commands specifying a delay period for network delay aware VM 123. In other embodiments, scheduler configuration commands 326 may be configured to leverage any existing scheduler 111 functionality leading to delays approximately matching those of measurement based switch back delays included in network delay input 325.

Figure 4:
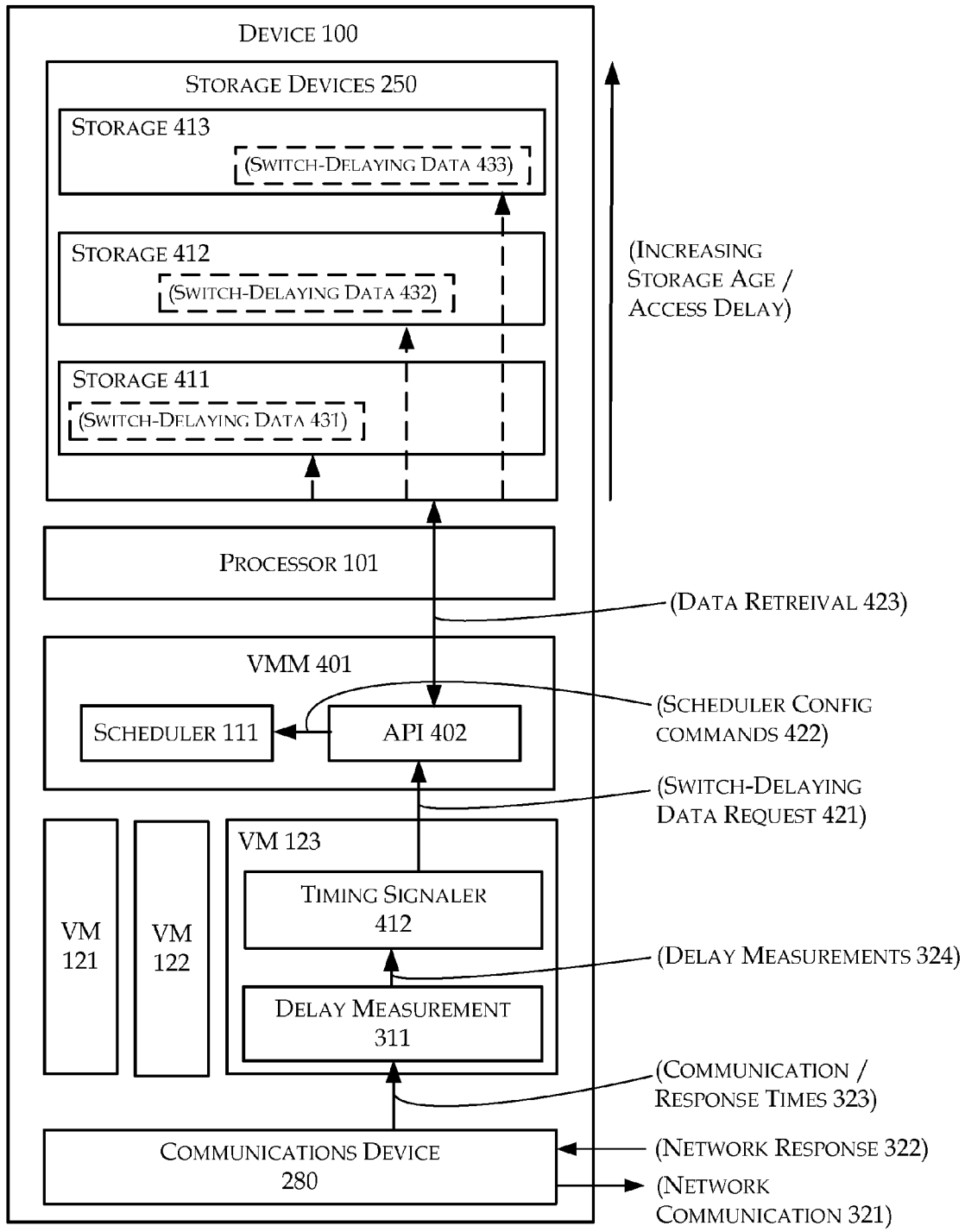
FIG. 4 is a block diagram illustrating an example device including a network delay aware VM configured to request switch-delaying data to adapt a VMM to delay switching back to network delay aware VM by approximately a measurement based switch back delay.

FIG. 4 is a block diagram illustrating an example device including a network delay aware VM configured to request switch-delaying data to adapt a VMM to delay switching back to network delay aware VM by approximately a measurement based switch back delay, arranged in accordance with at least some embodiments of the present disclosure. In FIG. 4, like elements to those illustrated in other drawings herein are given like identifiers. Device 100 comprises storage devices 250, processor 101, a VMM 401, VMs 121, 122, and 123, wherein VM 123 is a network delay aware VM, and communications device 280. Storage devices 250 comprise various example storage blocks 411, 412, and 413. Example storage block 411 comprises switch delaying data 431. Example storage block 412 comprises switch delaying data 432. Example storage block 413 comprises switch delaying data 433. VMM 401 comprises scheduler 111 and an API 402. Network delay aware VM 123 comprises a timing signaler module 412 and delay measurement module 311.

In some embodiments according to FIG. 4, timing signaler module 412 may be configured to adapt VMM 401 to delay switching back to network delay aware VM 123, wherein VMM 401 is configured as a non-network delay aware or "basic" VMM. Network delay aware VM 123 may be configured to request switch-delaying data such as 431, 432, or 433, so that VMM 401 delays switching back to network delay aware VM 123 to allow time to access switch-delaying data 431, 432, or 433.

VMM 401 may be configured to manage storage device 250 access, including access to some storage blocks 411-413, by buffering storage reads/writes in memory until enough reads/writes are gathered to justify accessing a particular storage block. In some cases, one or more storage blocks 411-413 may for example comprise storage locations on a hard disk. VMM 401 may buffer disk reads/writes in memory until enough reads/writes are gathered to justify spinning up the hard disk to access requested data or for other reasons. As a result, accessing switch-delaying data 431, 432, or 433 by VMM 401 takes longer than accessing data in system memory 220. VMM 401 may be configured to accommodate such data access delay by providing scheduler configuration commands 422 to scheduler 111, configuring scheduler 111 to delay switching back to a VM that requested switch delaying data 431, 432, or 433.

Network delay aware VM 123 can be configured to leverage the above described aspects of VMM 401 to induce a longer instance switch away from network delay aware VM 123 by requesting switch delaying data 431, 432, or 433. Timing signaler module 412 may be configured to receive delay measurements 324 from delay measurement module 311, and to calculate measurement based switch back delay, as discussed in connection with FIG. 3. Instead of generating a network delay input 325 as discussed in connection with FIG. 3, timing signaler module 412 may be configured to identify switch-delaying data for use in switch delaying data request 421. Timing signaler module 412 may be configured provide switch delaying data request 421 request comprising identified switch-delaying data to a data access API such as API 402.

FIG. 4 illustrates increasing storage age and/or access delay from storage 411, comprising switch delaying data 431, to storage 413, comprising switch delaying data 432. In some embodiments, requests for older switch delaying data, and/or switch delaying data in storage locations corresponding to a longer access times, may be effective to adapt VMM 401 to further delay switching back to network delay aware VM 123.

For example, in some embodiments, timing signaler module 412 may be configured to identify switch-delaying data 431 in switch delaying data request 421, wherein switch-delaying data 431 has a storage age older than a first predetermined storage age, in order to adapt VMM 401 to implement approximately a first delay length. Timing signaler module 412 may be configured to identify switch-delaying data 432 in switch delaying data request 421, wherein switch-delaying data 432 has a storage age older than a second predetermined storage age, in order to adapt VMM 401 to implement approximately a second delay length, and so on.

In some embodiments, timing signaler module 412 may be configured to identify switch-delaying data 431 in switch delaying data request 421, wherein switch-delaying data 431 is in storage location 411 having a first known approximate access delay, in order to adapt VMM 401 to implement approximately a first delay length. Timing signaler module 412 may be configured to identify switch-delaying data 432 in switch delaying data request 421, wherein switch-delaying data 432 is in storage location 412 having a second known approximate access delay, in order to adapt VMM 401 to implement approximately a second delay length, and so on. In some embodiments, timing signaler module 412 may be configured to identify switch-delaying data corresponding to calculated measurement based switch back delay.

Figure 5:
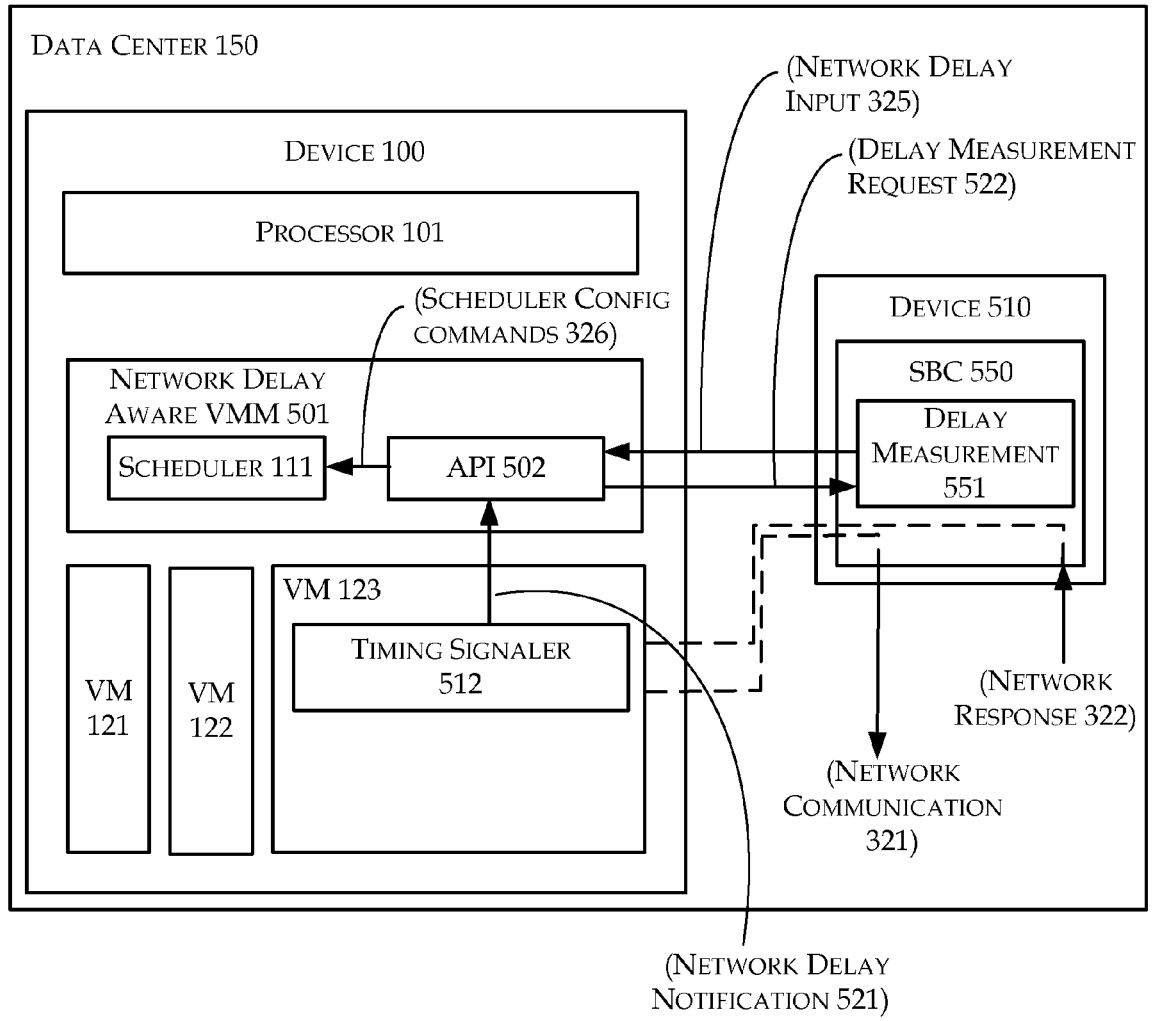
FIG. 5 is a block diagram illustrating an example data center including a device with a network delay aware VM and a network delay aware VMM, and a device with a network delay aware SBC.

FIG. 5 is a block diagram illustrating an example data center including a device with a network delay aware VM and a network delay aware VMM, and a device with a network delay aware SBC, arranged in accordance with at least some embodiments of the present disclosure. In FIG. 5, like elements to those illustrated in other drawings herein are given like identifiers. Data center 150 comprises device 100 and a device 510. Device 100 comprises processor 101, a network delay aware VMM 501, and VMs 121, 122, and 123; wherein VM 123 is a network delay aware VM. Network delay aware VMM 501 comprises scheduler 111 and an API 502. Network delay aware VM 123 comprises a timing signaler module 512. Device 510 comprises a network delay aware SBC 550 and network delay aware SBC 550 comprises a delay measurement module 551.

In embodiments according to FIG. 5, timing signaler module 512 may be configured to provide a network delay notification 521 to network delay aware VM 123, and network delay aware VMM 501. Network delay aware VMM 501 may be configured to handle many other aspects implementing measurement based switch back delay, with the advantages of uniformity of implementation within data center 150 and simplification of network delay aware VM 123. Network delay aware VM 123 may be configured to provide notification 521 to API 502, indicating a delay event as described herein.

In some embodiments, a low-cost point to collect delay measurements may be at network delay aware SBC 550. Modern data centers such as 150 maintain every connection between VMs within data center 150 and users connecting to data center 150, e.g. from computing devices 290 as illustrated in FIG. 2. SBCs are able to maintain sessions while data center 150 processes may be moved around within data center 150, e.g., to allow load balancing. In some embodiments, data center 150 may be configured to collect delay measurements at SBC 550 and/or any other location within data center 150. For example, delay measurements may be collected by an OpenFlow controller, management software, or other software based networking system, and retrieved and used similar to retrieval and use of measurements collected at SBC 550.

Network delay aware SBC 550 may be configured to handle network communications between VMs and computing devices 290, such as network communication 321 and network response 322. Network delay aware SBC 550 therefore has immediate access to delay information on every maintained session. Thus data center 150 may wish to offer a combined network delay aware API 502 and network delay aware SBC 550 that allows network delay aware VM 123 to request measurement based switch back delay via notification 521.

In some embodiments, network delay aware VM 123 may be configured to request delay measurements such as delay measurements 324, described in connection with FIG. 3, from network delay aware SBC 550. Network delay aware VM 123 may be configured to calculate measurement based switch back delay, and then request delay using an API such as API 302, as described in connection with FIG. 3.

In some embodiments, network delay aware SBC 550 may furthermore be configured to detect delay events and to notify API 502 of detected delay events. API 502 may implement measurement based switch back delay for requesting network delay aware VM 123 using delay events received from network delay aware SBC 550.

Network delay aware SBC 550 may be configured with delay measurement module 551. Delay measurement module 551 may be configured to measure network delays for all VMs in data center 150, or for network delay aware VMs such as 123. Delay measurement module 551 may optionally be activated/deactivated for particular VMs in data center 150 by data center VMs or VMMs. In some embodiments, network delay aware SBC 550 may be configured to calculate measurement based switch back delays for each tracked VM, and to provide network delay input 325 comprising measurement based switch back delay for an identified VM, such as network delay aware VM 123, to a requesting VMM, such as network delay aware VMM 501, in response to delay measurement request 522. In some embodiments, network delay aware SBC 550 may be configured to store unprocessed measurement delay measurements, such as delay measurements 324, for each tracked VM, and to provide network delay input 325 comprising delay measurements 324 for an identified VM, such as network delay aware VM 123, to a requesting VMM, such as network delay aware VMM 501, in response to delay measurement request 522.

Network delay aware VMM 501 and/or API 502 may be configured to retrieve network delay input 325 from network delay aware SBC 550 in response to network delay notification 521, or in advance thereof, e.g., upon loading network delay aware VM 123. For example, network delay aware VMM 501 may be configured to retrieve network delay input 325 by sending delay measurement request 522 to delay measurement module 551 and/or network delay aware SBC 550. Network delay input 325 may comprise measurement based switch back delay or delay measurements 324 as describe above. In embodiments wherein network delay input 325 comprises delay measurements 324, network delay aware VMM 501 may be configured to calculate measurement based switch back delay, as described above in connection with timing signaler module 312. Network delay aware VMM 501 may furthermore be configured to provide scheduler configuration commands 326 to scheduler 111, to adapt scheduler 111 to delay switching processor 101 back to execution of network delay aware VM 123 by approximately a delay amount determined using measurement based switch back delay, as also described above in connection with FIG. 3.

Figure 6:
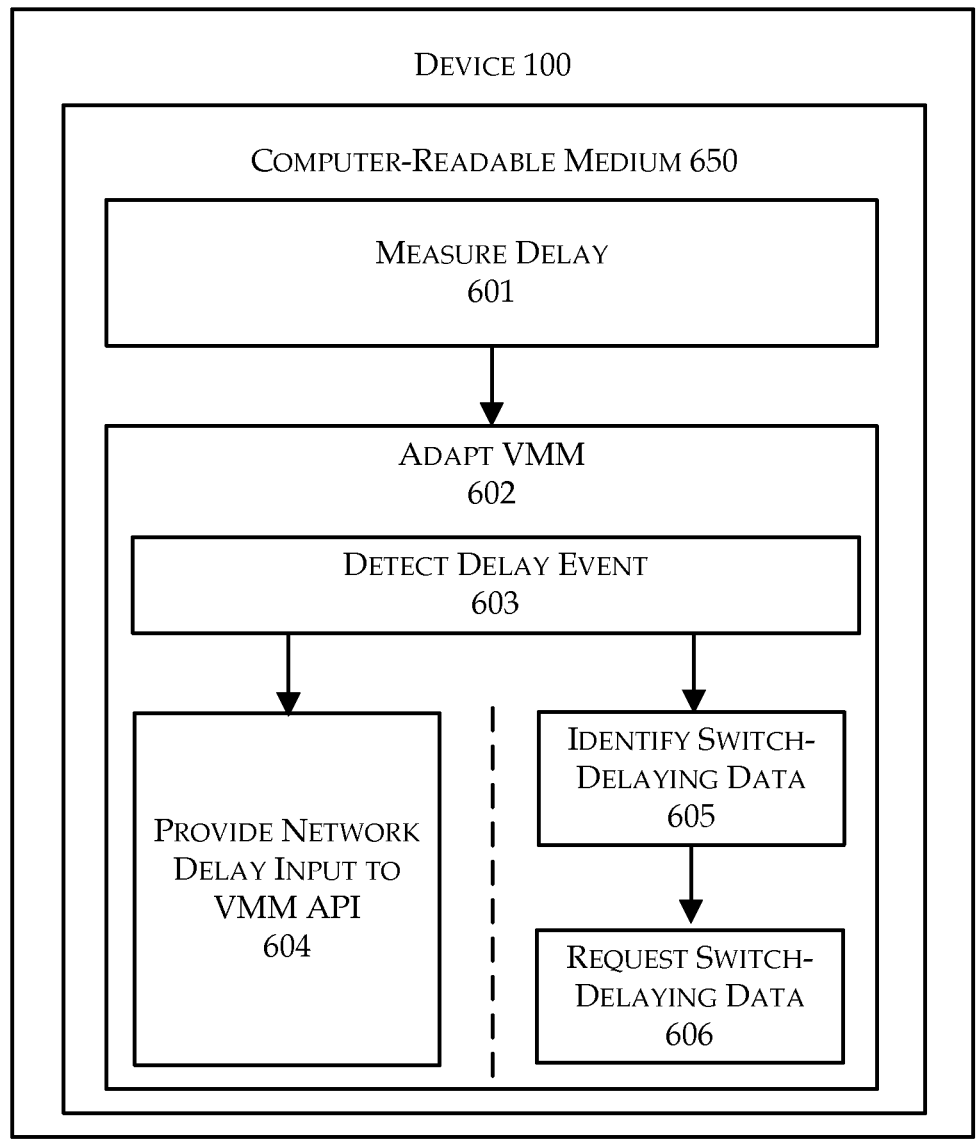
FIG. 6 is a flow diagram illustrating example methods that may be employed by a network delay aware VM.

FIG. 6 is a flow diagram illustrating example methods that may be employed by a network delay aware VM, arranged in accordance with at least some embodiments of the present disclosure. The example flow diagram may include one or more operations/modules as illustrated by blocks 601-606, which represent operations as may be performed in a method, functional modules in a device 100, and/or instructions as may be recorded on a computer readable medium 650. The illustrated blocks 601-606 may be arranged to provide functional operations including one or more of "Measure Delay" at block 601, "Adapt VMM" at block 602, "Detect Delay Event" at block 603, "Provide Network Delay Input to VMM API" at block 604, "Identify Switch-Delaying Data" at block 605, and/or "Request Switch-Delaying Data" at block 606.

In FIG. 6, blocks 601-606 are illustrated as being performed sequentially, with block 601 first and block 602, comprising blocks 603-606, last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 6 illustrates example methods by which network delay aware VM 123 may implement measurement based switch back delay. FIG. 6 illustrates embodiments involving network delay aware VMMs, which embodiments may employ block 604, as well as embodiments involving basic VMMs, which embodiments may employ blocks 605-606.

In a "Measure Delay" block 601, network delay aware VM 123 may be configured to activate a delay measurement module such as 311 or 551. The activated delay measurement module may begin measuring network delay. As described herein, delay measurement may be for select network communication types and/or destinations, and may measure communications delay and/or action delay. Block 601 may be followed by block 602.

In an "Adapt VMM" block 602, a timing signaler module such as 312, 412, or 512 may be configured to adapt a VMM such as 301, 401, or 501 to delay switching processor 101 back to execution of network delay aware VM 123 by approximately a delay amount comprising a measurement based switch back delay. In embodiments according to FIG. 5, block 602 may be carried out by sending a network delay notification 521 to API 502. Block 602 may calculate measurement based switch back delay using delay measurements from block 601, and measurement based switch back delay may be provided to the VMM either in advance of requesting measurement based delay, or simultaneously with requesting measurement based delay. Block 602 may include blocks 603 and either block 604 or blocks 605-606.

In a "Detect Delay Event" block 603, a timing signaler module such as 312, 412, or 512 may be configured to detect an outgoing network communication. In some embodiments, network communications with identified destination addresses may be of interest. In some embodiments of certain types, such as including data that is known to be associated with long communications or action delays, may be of interest. In some embodiments, any outgoing communication may be detected. It will be appreciated that delay events other than network communications may also be detected without departing from the spirit and scope of the described solution. In some embodiments, block 603 may be carried out with a network delay aware SBC 550 as described herein. Block 603 may be followed by blocks 604 or blocks 605-606.

Block 604 may be employed in embodiments involving network delay aware VMM 301, as described in connection with FIG. 3. In a "Provide Network Delay Input to VMM API" block 604, timing signaler module 312 may generate network delay input 325 comprising calculated measurement based switch back delay or delay measurements 324, and corresponding delay instructions, and provide network delay input 325 to VMM 301. In embodiments according to FIG. 5, block 604 may be carried out by interactions between network delay aware VMM 501 and network delay aware SBC 550, as described above.

Blocks 605-606 may be employed in embodiments involving basic VMM 401, as described in connection with FIG. 4. In an "Identify Switch-Delaying Data" block 605; timing signaler 412 may be configured to identify switch-delaying data such as 431, 432, and 433, for use in switch delaying data request 421. Block 605 may for example be configured to store data at various times, and to identify stored data in an age table including storage times and optionally corresponding likely access times. Block 605 may also be configured to store data in locations having known access delays, and identify stored data in a location table including storage locations and optionally corresponding likely access times. Block 605 may be configured to identifying data with a storage age older than a predetermined storage age using the age table, or to identify data with a storage location having a known approximate access delay using the location table. Block 605 may be followed by block 606.

In a "Request Switch-Delaying Data" block 606, timing signaler module 412 may be configured to adapt VMM 401 to delay switching by requesting switch-delaying data 431, 432, or 433, so that VMM 401 delays switching to allow time to access switch-delaying data 431, 432, or 433. Timing signaler module 412 may be configured to send a switch delaying data request 421 to data access API 402.

Figure 7:
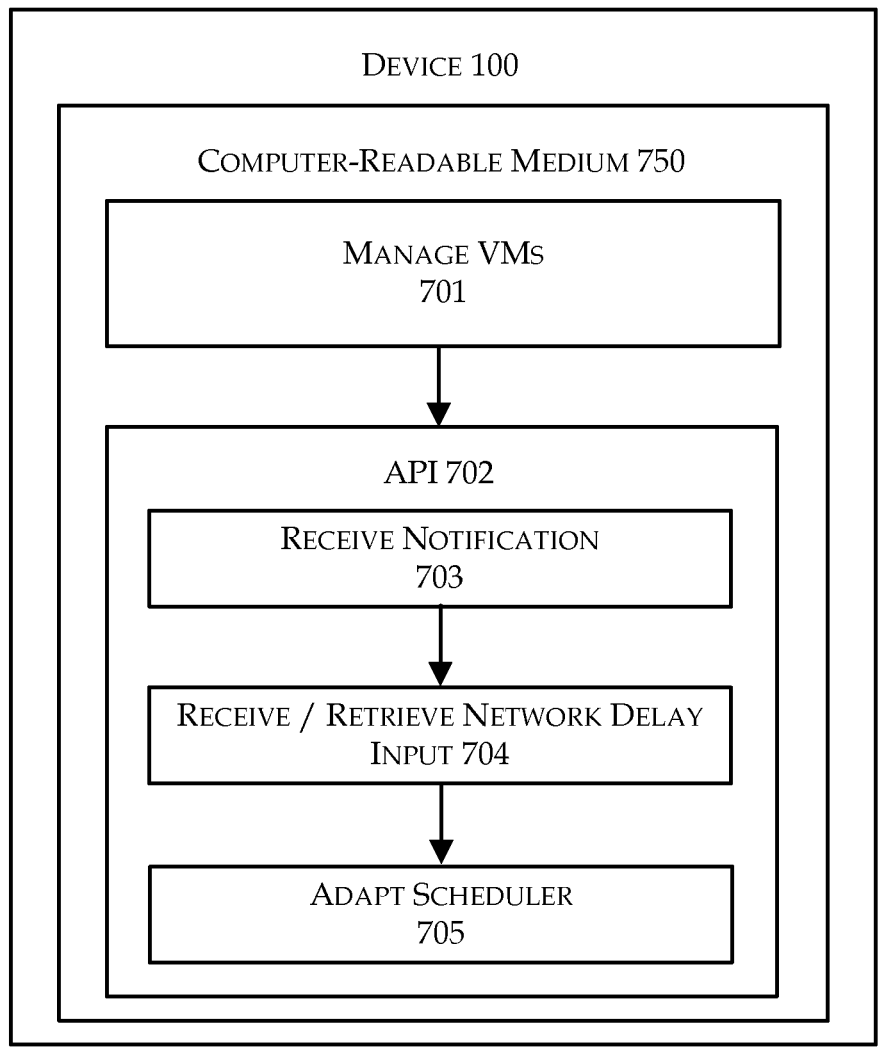
FIG. 7 is flow diagram illustrating example methods that may be employed by a network delay aware VMM, all arranged in accordance with at least some embodiments of the present disclosure.

FIG. 7 is flow diagram illustrating example methods that may be employed by a network delay aware VMM, arranged in accordance with at least some embodiments of the present disclosure. The example flow diagram may include one or more operations/modules as illustrated by blocks 701-705, which represent operations as may be performed in a method, functional modules in a device 100, and/or instructions as may be recorded on a computer readable medium 750. The illustrated blocks 701-705 may be arranged to provide functional operations including one or more of "Manage VMs" at block 701, "API" at block 702, "Receive Notification" at block 703, "Receive/Retrieve Network Delay Input" at block 704, and/or "Adapt Scheduler" at block 705.

In FIG. 7, blocks 701-705 are illustrated as being performed sequentially, with block 701 first and block 702, comprising blocks 703-705, last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 7 illustrates example methods by which by which network delay aware VMMs such as 301 and 501 may implement measurement based switch back delay. In a "Manage VMs" block 701, network delay aware VMM 301 or 501 may be configured to manage execution of VMs 121, 122, 123 by processor 101, wherein managing execution of VMs 121, 122, 123 comprises switching processor 101 between execution of different VMs. Block 701 may employ scheduler 111 and any of a variety of scheduling technologies. Block 701 may be followed by block 702.

In an "API" block 702, network delay aware VMM 301 or 501 may provide API 302 or 502. Block 702 may comprise providing a variety of available functions according to blocks 703-705, depending upon specific implementations and whether API 302 or API 502 is provided.

In a "Receive Notification" block 703, API 502 may be configured to receive a network delay notification 521 from timing signaler 512. Block 703 may be followed by block 704.

In a "Receive/Retrieve Network Delay Input" block 704, in embodiments comprising API 502, VMM 501 and/or API 502 may be configured to retrieve network delay input 325 from network delay aware SBC 550. In embodiments comprising API 302, VMM 301 and/or API 302 may be configured to receive network delay input 325 from network delay aware VM 123. In some embodiments, network delay input 325 may be retrieved or received long in advance of adapting scheduler 111 according to block 705, for example, seconds, minutes, or days in advance, all of which are long periods in terms of processor speed. In some embodiments, block 705 may be performed immediately after block 704. In either case, block 704 may be followed by block 705.

In a "Adapt Scheduler" block 705, VMM 301 or 501 may be configured to provide scheduler configuration commands 326 to scheduler 111, effective to configure scheduler 111 to delay switching back to network delay aware VM 123 according to measurement based switch back delay. As noted above, implementations of block 705 depend upon specific scheduler embodiments. In general, scheduler configuration commands 326 may comprise any commands configured to delay or foreclose scheduler 111 operations such that a network delay aware VM 123 is not given control of processor 101 for a desired delay period.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors which may include single or multicore configurations), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A server comprising:
   a processor;
   a network delay aware Virtual Machine Manager (VMM) configured to manage execution of a plurality of Virtual Machines (VMs) by the processor, wherein managing execution of the plurality of VMs comprises switching the processor between execution of different VMs,
   wherein the network delay aware VMM comprises an Application Program Interface (API) configured to receive a measured network delay from at least one network delay aware VM managed by the network delay aware VMM, and
   wherein the network delay aware VMM is configured to adapt a scheduler to delay switching the processor back to execution of the at least one network delay aware VM by approximately the measured network delay received at the API from the at least one network delay aware VM; and
   the at least one network delay aware VM, comprising:
      a delay measurement module configured to measure network delay between sending a network communication by the at least one network delay aware VM and receiving a network response by the at least one network delay aware VM, to thereby determine the measured network delay; and
      a timing signaler module configured to provide the measured network delay to the API at the network delay aware VMM in order to adapt the network delay aware VMM to delay switching the processor back to execution of the at least one network delay aware VM by approximately the measured network delay.

2. The server of claim 1, wherein the measured network delay comprises a network communications delay plus an action delay, wherein the action delay comprises delay associated with a user action to trigger the network response.

3. The server of claim 1, wherein the at least one network delay aware VM is configured with one or more game modules.

4. The server of claim 1, wherein the delay measurement module is configured to measure network delay at least in part by requesting delay data from a Session Border Controller (SBC).

5. The server of claim 1, wherein the server is configured to manage execution of other VMs than the at least one network delay aware VM, using a fair-sharing technique to switch the processor between execution of the other VMs.

6. A non-transitory computer readable storage medium having computer executable instructions executable by a processor, the instructions that, when executed by the processor, cause the processor to:
   measure, by a network delay aware Virtual Machine (VM), a network delay between sending a network communication by the network delay aware VM and receiving a network response by the network delay aware VM, to thereby determine a measured network delay; and
   provide the measured network delay to an API at a network delay aware Virtual Machine Manager (VMM) in order to adapt, by the network delay aware VM, the network delay aware VMM to delay switching the processor back to execution of the network delay aware VM by approximately the measured network delay, wherein the network delay aware VMM is configured to manage execution of a plurality of VMs by the processor, wherein managing execution of the plurality of VMs comprises switching the processor between execution of different VMs, and wherein the network delay aware VMM is configured to adapt a scheduler to delay switching the processor back to execution of the network delay aware VM by approximately the measured network delay received at the API from the network delay aware VM.

7. The non-transitory computer readable storage medium of claim 6, wherein the measured network delay comprises a network communications delay plus an action delay, wherein the action delay comprises delay associated with a user action to trigger the network response.

8. The non-transitory computer readable storage medium of claim 6, further comprising instructions that cause the processor to execute a game in the network delay aware VM, and wherein the network communication and network response are sent and received in connection with the game.

9. The non-transitory computer readable storage medium of claim 6, wherein the instructions that cause the processor to measure network delay are configured to request delay data from a Session Border Controller (SBC).

10. A method comprising:
    measuring, by a network delay aware Virtual Machine (VM), a network delay between sending a network communication by the network delay aware VM and receiving a network response by the network delay aware VM, to thereby determine a measured network delay; and
    providing, by the network delay aware VM, the measured network delay to an API at a network delay aware Virtual Machine Manager (VMM) in order to adapt the network delay aware VMM to delay switching the processor back to execution of the network delay aware VM by approximately the measured network delay, wherein the network delay aware VMM is configured to manage execution of a plurality of VMs by the processor, wherein managing execution of the plurality of VMs comprises switching the processor between execution of different VMs, and wherein the network delay aware VMM is configured to adapt a scheduler to delay switching the processor back to execution of the network delay aware VM by approximately the measured network delay received at the API from the network delay aware VM.

11. The method of claim 10, wherein the measured network delay comprises a network communications delay plus an action delay, wherein the action delay comprises delay associated with a user action to trigger the network response.

12. The method of claim 10, further comprising executing a game in the network delay aware VM, and wherein the network communication and network response are sent and received in connection with the game.

13. The method of claim 10, wherein the instructions that cause the processor to measure network delay are configured to request delay data from a Session Border Controller (SBC).

14. A non-transitory computer readable storage medium having computer executable instructions executable by a processor, the instructions that, when executed by the processor, cause the processor to:
    manage, by a network delay aware Virtual Machine Manager (VMM), execution of a plurality of Virtual Machines (VMs) by the processor, wherein managing execution of the plurality of VMs comprises switching the processor between execution of different VMs;
    provide an Application Program Interface (API) by the network delay aware VMM;
    receive by the API a network delay input comprising a network delay measured between sending a network communication by a network delay aware VM and receiving a network response by the network delay aware VM; and
    in response to receiving the network delay input by the API, adapt a scheduler to delay switching the processor back to execution of the network delay aware VM by approximately a delay amount determined using the network delay input.

15. The non-transitory computer readable storage medium of claim 14, wherein the network delay measured between sending a network communication by the network delay aware VM and receiving a network response by the network delay aware VM comprises a network communications delay plus an action delay, wherein the action delay comprises delay associated with a user action to trigger the network response.

16. The non-transitory computer readable storage medium of claim 14, further comprising instructions that cause the processor to co-locate VMs other than the network delay aware VM, which are associated with a same data center customer, on a server comprising the network delay aware VMM and network delay aware VM so that the co-located VMs benefit from processor time freed by delay in switching back to execution of the network delay aware VM.

17. The non-transitory computer readable storage medium of claim 14, further comprising instructions that cause the processor to manage execution of other VMs, other than the network delay aware VM, using a fair-sharing technique to time switching the processor between execution of the other VMs.

18. The non-transitory computer readable storage medium of claim 14, further comprising instructions that cause the processor to:
    receive by the API a notification from the network delay aware VM;
    retrieve, in response to the notification, a network delay input from a Session Border Controller (SBC), wherein the network delay input from the SBC comprises network delay measured at the SBC and associated with network communications and network responses of the of the network delay aware VM; and
    adapt the scheduler to delay switching the processor back to execution of the network delay aware VM by approximately a delay amount determined using the network delay input from the SBC.

19. A method comprising:
    managing, by a network delay aware Virtual Machine Manager (VMM), execution of a plurality of Virtual Machines (VMs) by a processor, wherein managing execution of the plurality of VMs comprises switching the processor between execution of different VMs;
    providing an Application Program Interface (API) by the network delay aware VMM;
    receiving by the API a network delay aware Virtual Machine (VM) network delay input comprising a network delay measured between sending a network communication by the network delay aware VM and receiving a network response by the network delay aware VM; and
    in response to receiving the network delay input by the API, adapting a scheduler to delay switching the processor back to execution of the network delay aware VM by approximately a delay amount determined using the network delay input.

20. The method of claim 19, wherein the network delay measured between sending a network communication by the network delay aware VM and receiving a network response by the network delay aware VM comprises a network communications delay plus an action delay, wherein the action delay comprises delay associated with a user action to trigger the network response.

21. The method of claim 19, further comprising co-locating other VMs, other than the network delay aware VM, which other VMs are associated with a same data center customer, on a server comprising the network delay aware VMM and network delay aware VM so that the other VMs benefit from processor time freed by delay in switching back to execution of the network delay aware VM.

22. The method of claim 21, further comprising managing execution of the other VMs using a fair-sharing technique to switch the processor between execution of the other VMs.

23. The method of claim 19, further comprising:
    receiving by the API a notification from the network delay aware VM;
    retrieving, in response to the notification, a network delay input from a Session Border Controller (SBC), wherein the network delay input from the SBC comprises network delay measured at the SBC and associated with network communications and network responses of the of the network delay aware VM; and adapting the scheduler to delay switching the processor back to execution of the network delay aware VM by approximately a delay amount determined using the network delay input from the SBC.

24. The server of claim 1, wherein the delay measurement module is configured to measure network delay at least in part by calculating a difference between an outgoing network communication time stamp and an incoming network response time stamp.

25. The server of claim 1, wherein the delay measurement module is configured to retrieve communication history data from a communication device, the communication history data comprising times of network communications and network responses.

26. The server of claim 1, wherein the delay measurement module is configured to measure network delay at least in part by starting a clock when the network communication is sent and stopping the clock when the network response is received.

27. The server of claim 1, wherein:

the delay measurement module is configured to measure network delay for a subset of cloud client devices associated with relatively slow response times that are longer than a predetermined threshold value; and the at least one network delay aware VM is configured to adapt the network delay aware VMM to delay switching the processor back to execution of the at least one network delay aware VM in connection with communications between the at least one network delay aware VM and the subset of cloud client devices.

\* \* \* \* \*

UNITED STATES PATENT AND TRADEMARK OFFICE
CERTIFICATE OF CORRECTION

PATENT NO. : 9,075,648 B2  
APPLICATION NO. : 13/582912  
DATED : July 7, 2015  
INVENTOR(S) : Kruglick Page 1 of 1

It is certified that error appears in the above-identified patent and that said Letters Patent is hereby corrected as shown below:

Specification

In Column 1, Line 8, delete "35 U.S.C. 371" and insert -- 35 U.S.C. § 371 --, therefor.

In Column 11, Line 19, delete "above Timing" and insert -- above. Timing --, therefor.

Claims

In Column 20, Line 27, in Claim 5, delete "VMs than" and insert -- VMs, other than --, therefor.

Signed and Sealed this
Twelfth Day of January, 2016

Michelle K. Lee
*Director of the United States Patent and Trademark Office*